United States Patent
Shao et al.

(10) Patent No.: US 12,313,411 B2
(45) Date of Patent: May 27, 2025

(54) METHODS FOR PLACE RECOMMENDATION IN THE SMART CITIES BASED ON INTERNET OF THINGS AND THE INTERNET OF THINGS SYSTEMS THEREOF

(71) Applicant: CHENGDU QINCHUAN IOT TECHNOLOGY CO., LTD., Sichuan (CN)

(72) Inventors: Zehua Shao, Chengdu (CN); Haitang Xiang, Chengdu (CN); Lei Zhang, Chengdu (CN); Yong Li, Chengdu (CN); Zhihui Wen, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 325 days.

(21) Appl. No.: 18/054,927

(22) Filed: Nov. 14, 2022

(65) Prior Publication Data
US 2023/0070728 A1    Mar. 9, 2023

(30) Foreign Application Priority Data
Oct. 18, 2022    (CN) .......................... 202211271526.4

(51) Int. Cl.
*G08G 1/01*    (2006.01)
*G01C 21/34*    (2006.01)
*G08G 9/00*    (2006.01)

(52) U.S. Cl.
CPC ........... *G01C 21/3407* (2013.01); *G08G 9/00* (2013.01)

(58) Field of Classification Search
CPC .. G01C 21/3407; G01C 21/3492; G08G 9/00; G08G 1/01; G08G 1/0145
(Continued)

(56) References Cited

U.S. PATENT DOCUMENTS 7,123,918 B1 * 10/2006 Goodman ............. H04W 24/00
                                                                      455/2.01
10,167,173 B1 *  1/2019 Abuelsaad ............. B66B 25/00
(Continued)

FOREIGN PATENT DOCUMENTS

| CN | 111144648 A | 5/2020 |
|---|---|---|
| CN | 112419123 A | 2/2021 |

OTHER PUBLICATIONS

Kaveh Khoshkhah et al., A Real-Time Model For Pedestrian Flow Estimation in Urban Areas based on IoT Sensors, Oct. 12, 2022, IEEE, pp. 4124-4130.*

*Primary Examiner* — Manglesh M Patel
(74) *Attorney, Agent, or Firm* — METIS IP LLC

(57) ABSTRACT

A method and a system for place recommendation in the smart city based on an Internet of Things are provided. The method is implemented by a management platform. The method includes: obtaining place information and pedestrian flow information of places, the place information including a count of the places, at least one distance between the places, and control measures for entrances and exits in each place, and control measures for passages, and the control measures include whether the entrances, exits, and passages in each place are closed; determining a plurality of candidate control schemes for the places based on the place information and the pedestrian flow information of the places; and determining a target control scheme of the places based on the plurality of candidate control schemes.

16 Claims, 6 Drawing Sheets

(58) Field of Classification Search
USPC .................................................. 701/23, 433
See application file for complete search history.

(56) References Cited

U.S. PATENT DOCUMENTS

| | | | | |
|---|---|---|---|---|
| 2003/0208966 | A1* | 11/2003 | Puskaric | E05G 5/003 |
| | | | | 52/64 |
| 2015/0073748 | A1* | 3/2015 | Mattsson | G01P 15/00 |
| | | | | 702/150 |
| 2017/0017846 | A1* | 1/2017 | Felemban | G06V 20/53 |
| 2017/0322529 | A1* | 11/2017 | Al-Mohssen | G05B 15/02 |
| 2018/0204451 | A1* | 7/2018 | Cross | G08G 1/005 |
| 2019/0051167 | A1* | 2/2019 | Malkes | G08G 1/0145 |
| 2019/0104596 | A1* | 4/2019 | Den Hartog | H05B 47/12 |
| 2019/0180202 | A1* | 6/2019 | Okimoto | G06F 18/295 |
| 2019/0249382 | A1* | 8/2019 | Zhou | E21F 11/00 |
| 2019/0385447 | A1* | 12/2019 | Marecek | G08G 1/04 |
| 2020/0247644 | A1* | 8/2020 | Ning | G06F 30/20 |
| 2021/0055122 | A1* | 2/2021 | Pham | G08G 1/0145 |
| 2021/0209615 | A1* | 7/2021 | Anami | G06Q 30/0201 |
| 2022/0034664 | A1* | 2/2022 | Vukich | G01C 21/3446 |
| 2023/0002984 | A1* | 1/2023 | Boda | E06B 11/085 |
| 2024/0323640 | A1* | 9/2024 | Tav | H04W 4/021 |
| 2024/0377202 | A1* | 11/2024 | Smart | G01C 21/206 |
| 2024/0394607 | A1* | 11/2024 | Akahane | G06Q 10/02 |

* cited by examiner

200

```
┌──────────────────────────────────────────────┐
│   Obtaining place information and pedestrian flow   │  ──210
│         information of at least one place           │
└──────────────────────────────────────────────┘
                        │
                        ▼
┌──────────────────────────────────────────────┐
│      Determining a plurality of candidate control     │  ──220
│    schemes based on the place information and the    │
│  pedestrian flow information of the at least one place │
└──────────────────────────────────────────────┘
                        │
                        ▼
┌──────────────────────────────────────────────┐
│   Determining a target control scheme of the at least │  ──230
│   one place based on the plurality of candidate control │
│                       schemes                         │
└──────────────────────────────────────────────┘
```

- 310: Constructing at least one first feature vector corresponding to the at least one place based on the place information and the pedestrian flow information of the at least one place

- 320: Performing vector retrieval in a vector database based on the first feature vector, and taking a vector in the vector database whose vector distance from the first feature vector is less than a preset distance threshold as a candidate vector

- 330: Determining a control measure corresponding to the candidate vector as a candidate control measure

- 340: Summarizing the candidate control measures of the entrances, exits, and passages of each place in the at least one place as the plurality of candidate control schemes

- Determining evaluation value of each first candidate control scheme, when a count of an iteration round is one, the first candidate control schemes being a plurality of initial candidate control schemes, when the count of the iteration rounds is greater than one, the first candidate control schemes being a plurality of candidate control schemes filtered in a previous round — 410

- Determining second candidate control schemes from the first candidate control schemes based on the evaluation value of each first candidate control scheme — 420

- Determining third candidate control schemes through performing transformation on the second candidate control schemes — 430

- Repeating the iterative process until the preset condition is satisfied — 440

- Determining the target control scheme from the third candidate control schemes obtained through the plurality of iterations — 450

Constructing a diagram structure — 510

Inputting the diagram structure into an evaluation model, outputting pedestrian flow preset by all the nodes in the diagram structure in a future time period, and obtaining the evaluation values of the candidate control schemes — 520

FIG. 5

METHODS FOR PLACE RECOMMENDATION IN THE SMART CITIES BASED ON INTERNET OF THINGS AND THE INTERNET OF THINGS SYSTEMS THEREOF

CROSS-REFERENCE TO RELATED APPLICATIONS

The application claims priority to Chinese Patent Application No. 202211271526.4, filed on Oct. 18, 2022, the contents of which may be hereby incorporated by reference to its entirety.

TECHNICAL FIELD

The present disclosure generally relates to the field of intelligent algorithm and Internet of Things technology, and in particular to, a method for place recommendation in the smart city based on an Internet of Things and an Internet of Things system thereof.

BACKGROUND

In some time periods with high pedestrian flow, such as tourist seasons or holidays, it is necessary to take relevant control measures for places with high pedestrian flow to appropriately reduce the pedestrian flow, so as to reduce a risk of epidemic transmission and safety hazards.

Usually, the pedestrian flow of a place needs to be determined or predicted before determining control measures. For example, patent application with application number of CN 201911360825.3 discloses a pedestrian flow prediction method, which determines a target pedestrian flow in a time period to be predicted based on a long-short-term memory network LSTM model and a fully connected neural network model. As another example, patent application with application number of CN 202011310784.X discloses a pedestrian flow control method, which builds a pedestrian flow heat map based on a heat map algorithm.

However, the pedestrian flow in different places may be usually different, and the control measures also may have certain differences. Therefore, the urgent problem to be solved at present is how to apply different control measures to different places in a targeted manner to control the pedestrian flow in places more accurately.

SUMMARY

One or more embodiments of the present disclosure provide a method for place recommendation in the smart city based on an Internet of Things. The method is implemented by a management platform of an Internet of Things (IoT) system for place recommendation in the smart city. The method comprises: obtaining place information and pedestrian flow information of at least one place, the place information including a count of the at least one place, at least one distance between the places, and control measures for entrances and exits in each place, and control measures for passages, and the control measures including whether the entrances, exits, and passages in each place are closed; determining a plurality of candidate control schemes for the at least one place based on the place information and the pedestrian flow information of the at least one place; and determining a target control scheme of the at least one place based on the plurality of candidate control schemes.

One or more embodiments of the present disclosure provide an Internet of Things system for place recommendation in a smart city. The system includes a management platform. The management platform is configured to perform operations including: obtaining place information and pedestrian flow information of at least one place, the place information including a count of the at least one place, at least one distance between the places, and control measures for entrances and exits in each place, and control measures for passages, and the control measures including whether the entrances, exits, and passages in each place are closed; determining a plurality of candidate control schemes for the at least one place based on the place information and the pedestrian flow information of the at least one place; and determining a target control scheme of the at least one place based on the plurality of candidate control schemes.

BRIEF DESCRIPTION OF THE DRAWINGS

The present disclosure will be further described in the form of exemplary embodiments, which will be described in detail by the accompanying drawings.

These embodiments are not restrictive. In these embodiments, the same number represents the same structure, wherein:

FIG. 2 is an exemplary flowchart of a process of a method for place recommendation in a smart city according to some embodiments of the present disclosure;

FIG. 3 is an exemplary flowchart of determining candidate control schemes according to some embodiments of the present disclosure.

FIG. 4 is an exemplary flowchart of determining a target control scheme according to some embodiments of the present disclosure.

FIG. 5 is an exemplary flowchart of determining an evaluation value according to some embodiments of the present disclosure.

DETAILED DESCRIPTION

In order to more clearly explain the technical scheme of the embodiments of the present disclosure, the following will briefly introduce the drawings that need to be used in the description of the embodiments. Obviously, the drawings in the following description are only some examples or embodiments of the present disclosure. For those skilled in the art, the present disclosure can also be applied to other similar scenarios according to these drawings without creative work. Unless it is obvious from the language environment or otherwise stated, the same label in the figure represents the same structure or operation.

It should be understood that the "system", "device", "unit" and/or "module" used herein is a method for distinguishing different components, elements, parts or assemblies at different levels. However, if other words can achieve the same purpose, they can be replaced by other expressions.

As shown in the description and the claims, unless the context expressly indicates exceptions, the words "a", "an", "the", "one", and/or "this" do not specifically refer to the singular, but may also include the plural; and the plural forms may be intended to include the singular forms as well, unless the context clearly indicates otherwise. Generally speaking, the terms "include" only indicate that the steps and elements that have been clearly identified are included, and these steps and elements do not constitute an exclusive list. Methods or equipment may also include other steps or elements.

A flowchart is used in this disclosure to explain the operation performed by the system according to the embodiment of the present disclosure. It should be understood that the previous or subsequent operations are not necessarily performed accurately in order. Instead, the steps may be processed in reverse order or simultaneously. At the same time, other operations may be added to these processes, or one or more steps may be removed from these processes.

Figure 1:
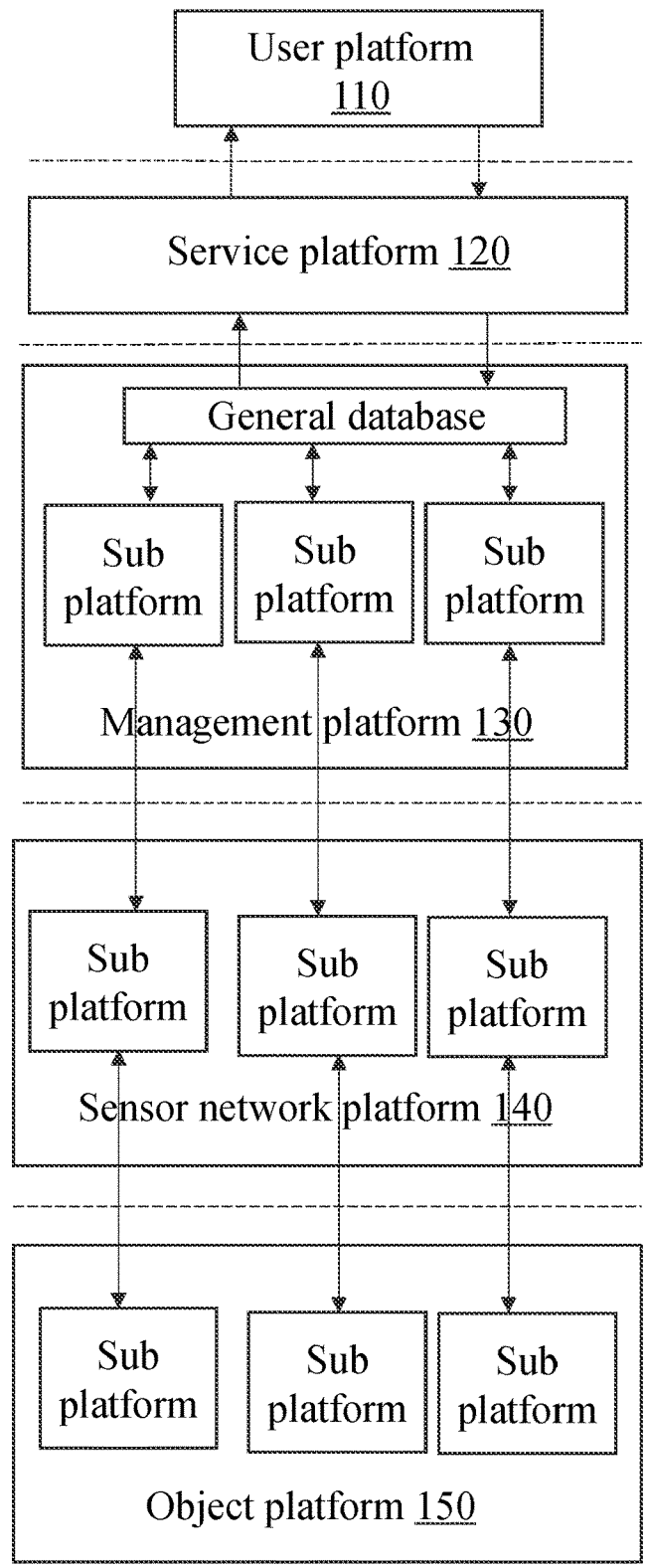
FIG. 1 is an exemplary schematic diagram of an Internet of Things system for place recommendation in a smart city according to some embodiments of the present disclosure.

FIG. 1 is an exemplary schematic diagram of an Internet of Things system for place recommendation in a smart city according to some embodiments of the present disclosure.

The Internet of Things (IoT) system may be an information processing system that includes part or all of a user platform, a service platform, a management platform, a sensor network platform, and an object platform. The user platform may be a functional platform that realizes obtaining perceptual information of the user and generating control information. The service platform may realize a connection of the management platform and the user platform, and play functions of service communication of the perceptual information and service communication of the control information. The management platform may realize overall planning and coordination of connection and cooperation between various functional platforms (such as the user platform and the service platform). The management platform may gather the information of the IoT operation system and may provide sensing management and control management functions for the IoT operation system. The sensor network platform may be a functional platform for managing sensing communication. In some embodiments, the sensor network platform may connect the management platform and the object platform to realize functions of sensing communication of the perceptual information and sensing communication of the control information. The object platform may be a functional platform for generating perceptual information.

Processing of information in the IoT system may be divided into a processing flow of the perceptual information of user and a processing flow of the control information. The control information may be information generated based on the perceptual information of the user. In some embodiments, the control information may include user demand control information, and the perceptual information of the user may include user query information. As used herein, processing of the perceptual information may be that the object platform obtains the perceptual information and transmits the perceptual information to the management platform through the sensor network platform. The user demand control information may be transmitted from the management platform to the user platform through the service platform, thereby realizing a control of sending prompt information.

In some embodiments, when the IoT system is applied to city management, it may be called as a IoT system in a smart city.

In some embodiments, as shown in FIG. 1, an IoT system for place recommendation in the smart city 100 may include a user platform 110, a service platform 120, a management platform 130, a sensor network platform 140, and an object platform 150.

The user platform 110 may be a platform for interacting with users. The users may be managers, tourists, etc. In some embodiments, the user platform 110 may be configured as a terminal device. For example, the terminal devices may include mobile devices, tablet computers, etc., or any combination thereof. In some embodiments, the user platform 110 may be configured to receive requests and/or instructions input by the user. For example, the user platform 110 may obtain, through the terminal device, query requests of the use for pedestrian flow and pedestrian flow control schemes in a plurality of areas of the city. In some embodiments, the user platform 110 may feedback information to the user through the terminal device. For example, the user platform 110 may display the pedestrian flow control schemes in a plurality of areas of the city to the user through a terminal device (e.g., a display). In some embodiments, the user platform 110 may send the requests and/or instructions input by the user to the service platform 120, and may obtain feedback information from the service platform 120.

The service platform 120 may be a platform for conveying user demands and control information, which may connect the user platform 110 and the management platform 130. In some embodiments, the service platform 120 may include processing devices as well as other components. The processing device may be a server or a server group. In some embodiments, the service platform 120 may employ a centralized arrangement. The centralized arrangement may mean that the service platform 120 uniformly receives, sends, and processes data. For example, the service platform 120 may send the query instruction of the use for pedestrian flow control schemes in a plurality of areas of the city to the management platform 130. As another example, the service platform 120 may send the pedestrian flow control schemes in a plurality of areas of the city generated by the management platform 130 to the user platform 110.

The management platform 130 may refer to a platform that overall plans and coordinates connection and cooperation between various functional platforms, gathers all information of the IoT, and provides sensing management and control management functions for the IoT operation system. For example, the management platform 130 may obtain the pedestrian flow of a plurality of places in a target area through the sensor network platform 140 (e.g., the pedestrian flow of a plurality of entrances, exits, and passages of the place), and determine the pedestrian flow control scheme based on the pedestrian flow of a plurality of places in the target area. In some embodiments, the management platform 130 may interact with the service platform 120. For example, the management platform 130 may send the pedestrian flow control scheme of each place to the service platform 120. In some embodiments, management platform 130 may include processing devices as well as other components. The processing device may be a server or a server group. In some embodiments, the management platform 130 may be a remote platform manipulated by management personnel, artificial intelligence, or a preset rule.

In some embodiments, the management platform 130 may adopt a front sub platform arrangement. The front sub platform arrangement may mean that the management platform includes a general database and a plurality of independent sub-platforms. Each sub-platform may store, process and/or transmit corresponding data according to different data sources, each sub-platform may further summarize the processed data into the general database, and the management platform 130 may analyze, process, and store the summarized data and then transmit the data to the service platform 120 through the general database. In some embodiments, the plurality of sub-platforms included in the management platform 130 may be determined according to preset areas in the city. For example, the management platform 130 may include a plurality of sub-platforms, such as a management sub-platform of area A, a management sub-platform of area B, and a management sub-platform of area C.

In some embodiments, in response to query requests of the user for pedestrian flow control schemes, the management platform 130 may obtain pedestrian flow information of places in the corresponding area from the sensor network platform 140, and then determine the pedestrian flow control schemes. For example, the management platform 130 may store, analyze, and process information related to the pedestrian flow of places in areas A, B, and C of city through the management sub-platform of area A, the management sub-platform of area B, and the management sub-platform of area C respectively and upload the information related to the pedestrian flow to the general database of the management platform 130. The management platform 130 may also further analyze and process the data related to the pedestrian flow in the general database, so as to obtain the pedestrian flow control schemes, and upload the pedestrian flow control schemes to the service platform 120 through the general database.

The sensor network platform 140 may be a functional platform that manages sensing communications. In some embodiments, the sensor network platform 140 may connect the management platform 130 and the object platform 150 to realize the functions of sensing communication of perceptual information and sensing communication of control information. In some embodiments, the sensor network platform 140 may include a plurality of sensor network sub-platforms.

In some embodiments, the sensor network platform 140 may adopt an independent arrangement. The independent arrangement may mean that the sensor network platform 140 uses different sub-platforms to store, process and/or transmit data of different types or different data sources. In some embodiments, the plurality of sub-platforms included in the sensor network platform 140 may be determined according to preset areas in the city, which may correspond to the sub-platforms of the management platform 130. For example, the sensor network platform 140 may be provided with a sensor network sub-platform of area A, a sensor network sub-platform of area B, and a sensor network sub-platform of area C, respectively corresponding to the management sub-platform of the area A, the management sub-platform of the area B, and the management sub-platform of the area C.

In some embodiments, in response to query instruction for pedestrian flow issued by the sub-platforms of the management platform 130, the sensor network platform 140 may obtain the pedestrian flow of the places from a monitoring device (for example, camera equipment) in the object platform 150 through the corresponding sub-platforms of the sensor network platform 140, and upload the pedestrian flow to the corresponding sub-platforms of the management platform 130.

The object platform 150 may be a functional platform for generating perceptual information. In some embodiments, the object platform 150 may be configured as at least one monitoring device. For example, the monitoring device may be deployed at the entrances, exits and passages of places in various areas of the city. In some embodiments, the object platform 150 may include a plurality of sub-platforms corresponding to the sub-platforms of the sensor network platform 140, respectively. In some embodiments, the object platform 150 may be configured to obtain information about various places within the target area. For example, the object platform 150 may obtain information of the pedestrian flow at a plurality of entrances, exits, and passages of a place based on the monitoring device (e.g., a camera device). In some embodiments, the object platform 150 may send the obtained relevant information of each place in the target area to the sub-platforms of the sensor network platform 140.

It should be noted that the IoT system for place recommendation in the smart city 100 may be provided for illustrative purposes only, and be not intended to limit a scope of the present disclosure. For those skilled in the art, various modifications or changes may be made based on the description of the present disclosure. For example, the IoT system for place recommendation in the smart city 100 may include one or more other suitable components to achieve similar or different functions. However, changes and modifications do not depart from the scope of the present disclosure.

FIG. 2 is an exemplary flowchart of a process for a method for place recommendation in a smart city according to some embodiments of the present disclosure. As shown in FIG. 2, the process 200 may include following steps. In some embodiments, the process 200 may be performed by the management platform 130.

In step 210, obtaining place information and pedestrian flow information of at least one place.

In some embodiments, the place information may refer to information about the place and/or information related to the pedestrian flow of the place. For example, the place information may include a count of the at least one place, distances between places, entrances, and exits in the places, passages in the places, and control measures thereof. For the method of obtaining the place information, please refer to the related description of FIG. 1.

In some embodiments, the count of places may refer to the count of all places within a certain area. For example, the count of places may be determined based on the count of all places to which a distance from a place A within a preset distance range (e.g., 3 km, 5 km, etc.). As another example, the count of places may be determined based on the count of all places in a street or cell to which a place B belongs. As another example, the count of places may be determined based on the count of all places (e.g., merchants in a place C, etc.) within the place C (e.g., a mall, etc.).

In some embodiments, the distance between places may refer to a distance between two places. For example, the distance between the places may be a straight-line distance between the two places, or a shortest commuting distance between the two places.

In some embodiments, entrance and exit in a place may refer to the entrance and exit in the place for passing through with an outside world. For example, the entrance and exit in the place may include entrance and exit of scenic spot, entrance and exit of shopping mall, or the like.

In some embodiments, the passage may refer to a road or route between the entrance and exit. For example, the passage may include a road between two places, or a route between entrance and exit within a place, or the like.

In some embodiments, the control measures may refer to measures applied to crowd gathering places to control the pedestrian flow and densities of the pedestrian flow, for example, closing a certain entrance and exit of a place, implementing one-way traffic between two entrances and exits of a place, and placing a certain length of isolation fence or isolation belt at a certain entrance and exit of a place.

In some embodiments, the pedestrian flow information may refer to a count of people entering the place per unit time (e.g., 50 people/minute). For example, the management platform may count the pedestrian flow at all locations (e.g., the entrances, exits, passages, etc.) of the place to obtain pedestrian flow information of the place. For the method of obtaining the pedestrian flow information, please refer to the relevant description of FIG. 1.

In step 220, determining a plurality of candidate control schemes based on the place information and the pedestrian flow information of the at least one place.

In some embodiments, a candidate control scheme may refer to a set of control measures corresponding to the at least one place. For example, the management platform may determine all candidate control measures that may be taken by a plurality of places based on the place information and pedestrian flow information of a plurality of places to obtain a plurality of candidate control schemes.

In some embodiments, the candidate control schemes may be determined by the management platform. For example, the management platform may determine the candidate control schemes based on algorithms or models.

In some embodiments, the management platform may construct a vector based on pedestrian flow information of the place before controlling, match the vector in a data vector database of historical data to obtain a candidate vector, and summarize a control measure corresponding to the candidate vector as the candidate control scheme. For more details on determining the candidate control schemes, please refer to the related description of FIG. 3.

In step 230, determining a target control scheme of the at least one place based on the plurality of candidate control schemes.

In some embodiments, the target control scheme may refer to a final control scheme determined from the candidate control schemes. For example, the management platform may take the candidate control scheme that satisfy preset condition as the target control scheme.

In some embodiments, the target control scheme may be determined by the management platform. For example, the management platform may determine the target control scheme based on algorithms or models.

In some embodiments, when the count of the at least one places is greater than a preset count threshold, the management platform may perform a plurality of rounds of iterative updates on the candidate control schemes until the preset condition is satisfied to determine the target control scheme. For more details on determining the target control scheme, please refer to the related description in FIG. 4.

In some embodiments of the present disclosure, the plurality of candidate control schemes may be determined based on the pedestrian flow information of the at least one place, and a final target control scheme may be determined based on the plurality of candidate control schemes, and corresponding control schemes may be recommended for different places, which may more accurately control the pedestrian flow of the places, save control resources, improve a control efficiency, and realize reasonable control of the places.

It should be noted that the above description about the process 200 is only for example and illustration, and does not limit the scope of application of the present disclosure. For those skilled in the art, various modifications and changes may be made to the process 200 under the guidance of the present disclosure. However, these corrections and changes are still within the scope of the present disclosure.

FIG. 3 is an exemplary flowchart of determining candidate control schemes according to some embodiments of the present disclosure. As shown in FIG. 3, the process 300 may include following operations. In some embodiments, the process 300 may be performed by the management platform 130.

In step 310, constructing at least one first feature vector corresponding to the at least one place based on the place information and the pedestrian flow information of the at least one place.

In some embodiments, the pedestrian flow information of the place may refer to the pedestrian flow information of the place before the target control scheme is executed. In some embodiments, the first feature vector may refer to a feature vector characterizing attributes or features of the place (e.g., place information, pedestrian flow information, etc.).

In some embodiments, one feature of the place may correspond to one element of the first feature vector, and each element value of the first feature vector may represent a feature value of its corresponding feature. For example, the first feature vector may be (a, b, c, d, e, f), where a represents the count of places, b represents the distance between places, c represents entrances and exits in places, d represents passages, e represents the control measures, and f represents the pedestrian flow information. In some embodiments, element values in the first feature vector may be actual values of the features, for example, an element value a=30 may indicate that a count of the places is 30. In other embodiments, actual situations of the features may be classified according to a preset corresponding relationship, and values of the classification may be used as values of the elements in a place feature vector. For example, the preset corresponding relationship of a control measure e may be that: e=0 means that the control measure is not controlled, e=1 means that the control measure adopted by the place is a first control measure, e=2 means that the control measure adopted by the place is a second control measure, etc., the first control measure and the second control measure may be any two preset different control measures, which may be not limited in the present disclosure.

The vector database may include historical data vectors of a plurality of places. In some embodiments, the management platform 130 may obtain historical data of the plurality of places, and construct a plurality of historical data vectors according to the historical data to form the vector database.

In some embodiments, the historical data vector may refer to the historical feature vector of the place constructed by the management platform 130 based on the historical data of the place. For more details about the construction of the historical data vector, please to refer to a method for constructing the place vector above. In some embodiments, the historical data may refer to data related to historical pedestrian flow of a place. For example, the historical data may include historical pedestrian flow information and corresponding historical control measures, historical control schemes, or the like.

In step 320, performing vector retrieval in a vector database based on the first feature vector, and taking a vector in the vector database whose vector distance from the first feature vector is less than a preset distance threshold as a candidate vector.

In some embodiments, the candidate vector may refer to a historical data vector in the vector database that has a certain similarity with the first feature vector of the place.

In some embodiments, the management platform 130 may determine vector distances between the first feature vector and each historical data vector in the vector database, and use a vector in the vector database whose vector distance from the first feature vector is less than a preset distance threshold as a candidate vector. The vector distance may include, but be not limited to, Euclidean distance, cosine distance, Markov distance, Chebyshev distance, and/or Manhattan distance, etc.

In step 330, determining a control measure corresponding to the candidate vector as a candidate control measure.

In some embodiments, the candidate control measures may refer to control measures corresponding to the candidate vectors. For example, in a candidate vector (a, b, c, d, e, f), a value of the element e represents a control measure, and the management platform 130 may determine e as a candidate control measure of the candidate vector.

In step 340, summarizing the candidate control measures of the entrances, exits, and passages of each place in the at least one place as the plurality of candidate control schemes.

The candidate control scheme may refer to a set of the plurality of candidate control measures. In some embodiments, the management platform 130 may summarize candidate control measures of entrances, exits, passages, etc. of a plurality of places as candidate control schemes based on preset summarization rules. For example, the control measures may be summarized based on feature values of the first feature vector (for example, the control measures e, etc.), or all candidate control schemes may be summarized directly in a form of a matrix or table.

In some embodiments of the present disclosure, the first feature vector and the vector database of the places may be by constructed, and the first feature vector may be retrieved in the vector database to obtain a candidate control scheme. Through the above technical scheme, it filters out unreasonable control measures, improves a calculation efficiency, and simplifies a calculation amount of the subsequent determination of the target control scheme.

FIG. 4 is an exemplary flowchart of determining a target control scheme according to some embodiments of the present disclosure. In some embodiments, the process 400 may be performed by the management platform 130. As shown in FIG. 4, the process 400 may include following operations.

In some embodiments, in response to a determination that the count of the at least one place is greater than a preset count threshold, the management platform 130 may determine the target control scheme through a preset algorithm.

The preset count threshold may be a count of places preset based on experience. For example, the preset count threshold may be 50, 100, or the like.

The preset algorithm may refer to a method of deduction based on modeling or various analysis algorithms to determine the target control scheme. For example, the management platform 130 may generate a plurality of candidate control schemes based on a combination of open or closed states of a plurality of control measures of the plurality of places, and analyze each candidate control scheme one by one to determine an optimal control scheme, and determine the open or closed states of control scheme of each place based on the optimal control scheme.

In some embodiments, the management platform 130 may determine the target control scheme through performing a plurality of rounds of iterative updates on a plurality of candidate control schemes based on a preset algorithm until a preset condition is satisfied.

The preset condition may refer to a termination condition of a plurality of rounds of iterative updates. For more details, please refer to the description below.

In some embodiments, the management platform 130 may perform a plurality of rounds of iterative updates on the plurality of candidate control schemes based on a preset algorithm. Each round of plurality of rounds of iterative updates may include following operations.

In step 410, determining evaluation value of each first candidate control scheme, when a count of an iteration round is one, the first candidate control schemes being a plurality of initial candidate control schemes, when the count of the iteration rounds is greater than one, the first candidate control schemes being a plurality of candidate control schemes filtered in a previous round.

In some embodiments, the management platform 130 may set an iteration counter for determining whether the count of iteration rounds is greater than 1. When the count of iteration rounds is 1, the first candidate control scheme may be the plurality of initial candidate control schemes. For more content about the plurality of initial candidate control schemes, please refer to the related contents of FIG. 2 and FIG. 3.

In some embodiments, the management platform 130 may encode each candidate control scheme in the plurality of initial candidate control schemes based on a preset coding rule.

The preset coding rule may refer to a rule used to characterize the open or closed states of control measures of various places in the candidate control schemes. For example, the preset coding rule may characterize various combinations of open or closed states of different entrances and exits, and passages of various places. Coding rule may be represented in various forms, for example, binary encoding, symbol encoding, etc. In some embodiments, 1 and 0 may be used to indicate the open and closed states of the control measures.

In some embodiments, the plurality of candidate control schemes encoded based on the preset coding rule may be in form of vectors or matrices. Exemplarily, for the place A, the place B, the place C, and the place D, there may be three entrances and exits a1, a2, and a3 of the place A, two entrances and exits b1, b2 of the place B, and the place C may be an open gathering place (no entrance and exit), there may be one entrance and exit d1 of the place D, the candidate control scheme may be ((1, 0, 1), (1, 0), (1), (0)), the first element (1, 0, 1) represents a control measure of the place A, similarly, other elements represent control measures of the corresponding places B, C, and D.

The one or more evaluation values may refer to one or more values used to determine whether each candidate control scheme satisfies a requirement. For example, the one or more evaluation values may be one or more numerical values in an interval of [0, 1], and the evaluation value is larger, indicating that a corresponding candidate control scheme is more suitable for the requirement. The one or more evaluation values may be determined based on the pedestrian flow of the candidate control scheme.

In some embodiments, the management platform 130 may count the pedestrian flow of each place after opening/closing of the control measures of each place with reference to the candidate control schemes, and determine evaluation coefficients of each place based on a relationship between the pedestrian flow of each place and preset pedestrian flow threshold of corresponding each place, and determine one or more evaluation values of the candidate control scheme based on the evaluation coefficients of all places in the candidate control scheme.

The evaluation coefficient may characterize whether the pedestrian flow of a certain place in the candidate control scheme satisfy requirement. The evaluation coefficient may be a value in the interval of [0, 1], the evaluation coefficient is lager, indicating that the control effect of pedestrian flow of the corresponding place is better. For example, when the pedestrian flow (for example, a sum of the pedestrian flow of the entrance, exit, and passage) adjusted by the control measures of a certain place in the candidate control scheme is close to a preset pedestrian flow threshold of the place, the evaluation coefficient may be determined to be 1. The management platform 130 may sequentially decrease the evaluation coefficient in proportion (for example, 0.02) based on a difference between the pedestrian flow adjusted by the control measure of the place and the preset pedestrian flow threshold of the place (for example, an absolute value of the difference between the pedestrian flow adjusted by the control measure of the place and the preset pedestrian flow threshold of the place). For example, the difference threshold may be preset as 200 people. When the difference is 200 people, the evaluation coefficient may be 1−0.02=0.98; when the difference is 400 people, the evaluation coefficient may be reduced to 1−0.02*2=0.96.

In some embodiments, after obtaining the evaluation coefficients of all places in the candidate control scheme, the management platform 130 may use the value obtained by performing mean square error calculation on all the evaluation coefficients as the evaluation value of the candidate control scheme.

It should be understandable that after the candidate control scheme is adjusted by the control measures, the pedestrian flow of different places in the candidate control scheme may change. When the pedestrian flow of each place fluctuates around a preset pedestrian flow threshold, an effect of the candidate control scheme may be better.

In some embodiments, the evaluation value may be determined based on a pedestrian flow prediction model, please refer to FIG. 5 and its description for more details.

In step 420, determining second candidate control schemes from the first candidate control schemes based on the evaluation value of each first candidate control scheme.

The second candidate control schemes may refer to a plurality of candidate control schemes selected from the first candidate control schemes. A count of the second candidate control schemes may be a preset count or ratio. For example, 4 candidate control schemes or 8 candidate control schemes may be selected, or the candidate control scheme may be selected according to a proportion of the first candidate control schemes (for example, 10%).

In some embodiments, the management platform 130 may determine the second candidate control schemes based on probabilities of each first candidate control scheme in the first candidate control schemes being selected through a preset selection function. The selection function may be various preset selection operators. For example, the selection function may be a roulette selection operator, an expected value selection operator, a uniform sorting operator, or the like.

In some embodiments, probabilities that each first candidate control scheme is selected as the second candidate control scheme may be determined based on ratios of the evaluation values of each first candidate control scheme to a total evaluation value.

The total evaluation value may be a sum of the evaluation values of all the first candidate control schemes. When the ratio of the evaluation value of a candidate control scheme to the total evaluation value is larger, a probability of the candidate control scheme being selected by the selection function may be larger.

In step 430, determining third candidate control schemes through performing transformation on the second candidate control schemes. The third candidate control schemes may include new candidate control schemes generated after performing the transformation on the second candidate schemes.

Transformation may refer to a method of processing candidate control schemes based on preset rule to generate new control schemes. For example, the transformation may include recombining the open/closed states of the control measures of a certain place in a certain candidate control scheme, etc. For example, in a second candidate control scheme, an exit a1 of the place A may be set from an original open state to a closed state, and an exit a2 may be set from an original closed state to an open state, thereby generating the third candidate control schemes.

In some embodiments, the management platform 130 may process the third candidate control scheme to determine an evaluation value of the third candidate control scheme. It should be understood that when the evaluation value of the third candidate control scheme is higher, the probability of the third candidate control scheme being selected for transformation in a next round of iterations may be higher.

It should be noted that the third candidate control schemes may be a set of candidate control schemes. The third candidate control scheme may include selected second candidate control schemes, new candidate control schemes generated based on the transformation of the second candidate control schemes, and unselected candidate control schemes in the first candidate control schemes. It should be understood that new candidate control schemes may be added as the transformation process proceeds based on the first candidate control schemes.

In some embodiments, the transformation may include a first transformation and a second transformation. The management platform 130 may generate a plurality of third candidate control schemes through the transformation.

The first transformation may be a processing method for generating one or more third candidate control schemes by selecting two the second candidate control schemes from the plurality of second candidate control schemes, and exchanging the control measures of one or more places in the two second candidate control schemes.

In some embodiments, for the two selected second candidate control schemes, the management platform 130 may exchange the control measures of places with high evaluation coefficients, respectively, to generate two third candidate control schemes.

Exemplarily, the selected two second candidate control schemes P1 and P2 may be respectively ((1, 0, 1), (1, 0), (1), (0)) and ((1, 1, 0), (1, 1), (1), (0)), the evaluation coefficient of the place A in P1 may be the highest, and the evaluation coefficient of the place B in P2 may be the highest, then the management platform 130 may replace control measure (1, 0, 1) of the place A in P1 with control measure (1, 1, 0) of the place A in P2 to generate ((1, 0, 1), (1, 1), (1), (0)). At the same time, the management platform 130 may replace the control measure of the place B in P2 with the control measure of the place B of P1 to generate ((1, 0, 1), (1, 1), (1), (0)). That is, based on the exchange of the control measures of the place where the evaluation coefficient is high, two third candidate control schemes P3 ((1, 0, 1), (1, 1), (1), (0)) and P4 ((1, 1, 0), (1, 1), (1), (0)) may be generated, respectively.

It should be understood that exchanging the control measures of the places with high evaluation coefficients in the second candidate control schemes may help to retain and spread the control measures that have a better control effect on pedestrian flow in the second candidate control schemes to the new candidate control schemes.

In some embodiments, the management platform 130 may select a plurality of pairs of second candidate control schemes for performing first transformation processing to generate pairs of third candidate control schemes based on a preset first transformation count threshold (e.g., 3 pairs) or a preset first transformation ratio (e.g., 20%). For example, if there are 20 first candidate control schemes, the management platform 130 may select 4 (20*20%=4) second candidate control schemes from the first candidate control schemes based on a preset selection function, and perform the first transformation on the four second candidate control schemes to generate four third candidate control schemes correspondingly.

In some embodiments, the management platform 130 may process the plurality of third candidate control schemes generated based on the first transformation to determine the evaluation values of the plurality of third candidate control schemes.

The second transformation may refer to a processing method of adjusting the open/closed state of at least one control measure of one or more places in the third candidate control schemes generated after the first transformation.

In some embodiments, the management platform 130 may adjust one or more control measures of a place with a lowest evaluation coefficient in the third candidate control schemes. For example, one or more entrances and exits of the place with the lowest evaluation coefficient may be set from a closed state to an open state, or from an open state to a closed state, thereby generating a new third candidate control scheme.

Exemplarily, for a third candidate control scheme P3 ((1, 0, 1), (1, 1), (1), (0)) generated based on the first transformation, if the evaluation coefficient of the place B is the lowest, the management platform 130 may adjust the control measure (1, 1) of the place B.

In some embodiments, the management platform 130 may obtain pedestrian flow data (for example, the pedestrian flow data of a plurality of entrances and exits) of all the control measures of the place with the lowest evaluation coefficient in the third candidate control scheme, and adjust the control measures whose pedestrian flow data does not satisfy the preset pedestrian flow threshold. For example, the open state (i.e., "1") of the first element of the control measure (1, 1) of the place B in P3 may be set to closed. As used herein, if the pedestrian flow of the control measures corresponding to the first element does not satisfy the preset pedestrian flow threshold, the generated third candidate control scheme may be ((1, 1, 0), (0, 1), (1), (0)). It should be noted that, this is only an example, and the second transformation may also be performed in other reasonable manners. For example, the second transformation may be to adjust the control measures of the place with the lowest evaluation coefficient in the third candidate control scheme according to a preset adjustment ratio (for example, randomly selecting 50% of the entrances and exits to be adjusted from open to closed) to generate a new candidate control scheme after the second transformation.

In some embodiments, the management platform 130 may select a plurality of third candidate control schemes to perform second transformation processing based on a preset second transformation ratio (e.g., 5%) to generate a plurality of new third candidate control schemes. For example, if there are 20 third candidate control schemes, 1 (20*5%) third candidate control scheme is selected to perform the second transformation based on a preset second transformation ratio of 5% to generate a new third candidate control scheme after the second transformation accordingly.

According to some embodiments of the present disclosure, the third candidate control scheme may be generated through the first transformation and the second transformation, which may improve an efficiency of iteration and help to obtain an optimal control scheme more quickly.

In some embodiments, the management platform 130 may filter the third candidate control schemes based on evaluation values of each third candidate control scheme, and determine the filtered third candidate control schemes as candidate control schemes for a next round of iteration or use the filtered third candidate control schemes to determine the target control scheme.

Exemplarily, the management platform 130 may sort the third candidate control schemes in descending order according to the evaluation values, and remove the third candidate control schemes with lower ranking. For example, the management platform 130 may remove the third candidate control schemes with lower ranking according to a preset ratio (e.g., 5%) or a preset count (e.g., 8). The filtering may also be performed in other suitable manners. For example, the management platform 130 may obtain a count n of third candidate control schemes newly generated in a current round of iteration, and then remove the n candidate management solutions with the lowest evaluation value. Manners of the filtering may be not limited in the present disclosure.

In step 440, repeating the iterative process until the preset condition is satisfied.

In some embodiments, the management platform 130 may repeat the process for the step 420 and step 430 to iteratively update the third candidate control scheme, and stop the iteration until the preset condition is satisfied.

The preset condition may be that a count of iterations is greater than a preset maximum count of iterations (e.g., 50 times, 100 times). As another example, the preset condition may be that the evaluation values of the candidate control schemes reach a preset expected value (e.g., 1, 0.98). As another example, the preset condition may be that the maximum evaluation value of the candidate control schemes remains unchanged for n iterations, or a difference between the maximum evaluation value of the candidate control schemes in two adjacent iterative updates is lower than a preset difference threshold (e.g., 0.02, 0.03). It should be noted that the preset condition may be a combination of one or more of the above, which is not limited in the present disclosure.

In step 450, determining the target control scheme from the third candidate control schemes obtained through the plurality of iterations.

In some embodiments, the management platform 130 may use the third candidate control scheme with a largest evaluation value as the target control scheme among the third candidate control schemes obtained from a plurality of rounds of iterations. For example, the management platform 130 may sort the third candidate control schemes according to the evaluation values in descending order, and determine the third candidate control scheme with the highest ranking as the target control scheme.

In some embodiments, the management platform 130 may, based on the target control scheme, adjust the open or closed state of the control measures of each place corresponding to the target control scheme.

According to some embodiments of the present disclosure, an optimal pedestrian flow control scheme may be obtained through a preset algorithm, and the open or closed state of the control measures of a plurality of places may be further determined, which may reduce manpower and time costs caused by manual deduction.

FIG. 5 is an exemplary flowchart of determining an evaluation value according to some embodiments of the present disclosure. As shown in FIG. 5, the process 500 may include following operations. In some embodiments, the process 500 may be performed by the management platform 130.

In step 510, constructing a diagram structure.

The diagram structure may be called as a pedestrian flow diagram. A pedestrian flow diagram may refer to a diagram constructed based on relevant information of a plurality of places in an area. The pedestrian flow diagram may characterize a pedestrian flow relationship between the plurality of places in the area. In some embodiments, the management platform 130 may construct the pedestrian flow diagram based on basic information of a plurality of places in the area and the open/closed states of the control measures of each place. A pedestrian flow diagram may include a plurality of nodes and a plurality of edges.

Figure 6:
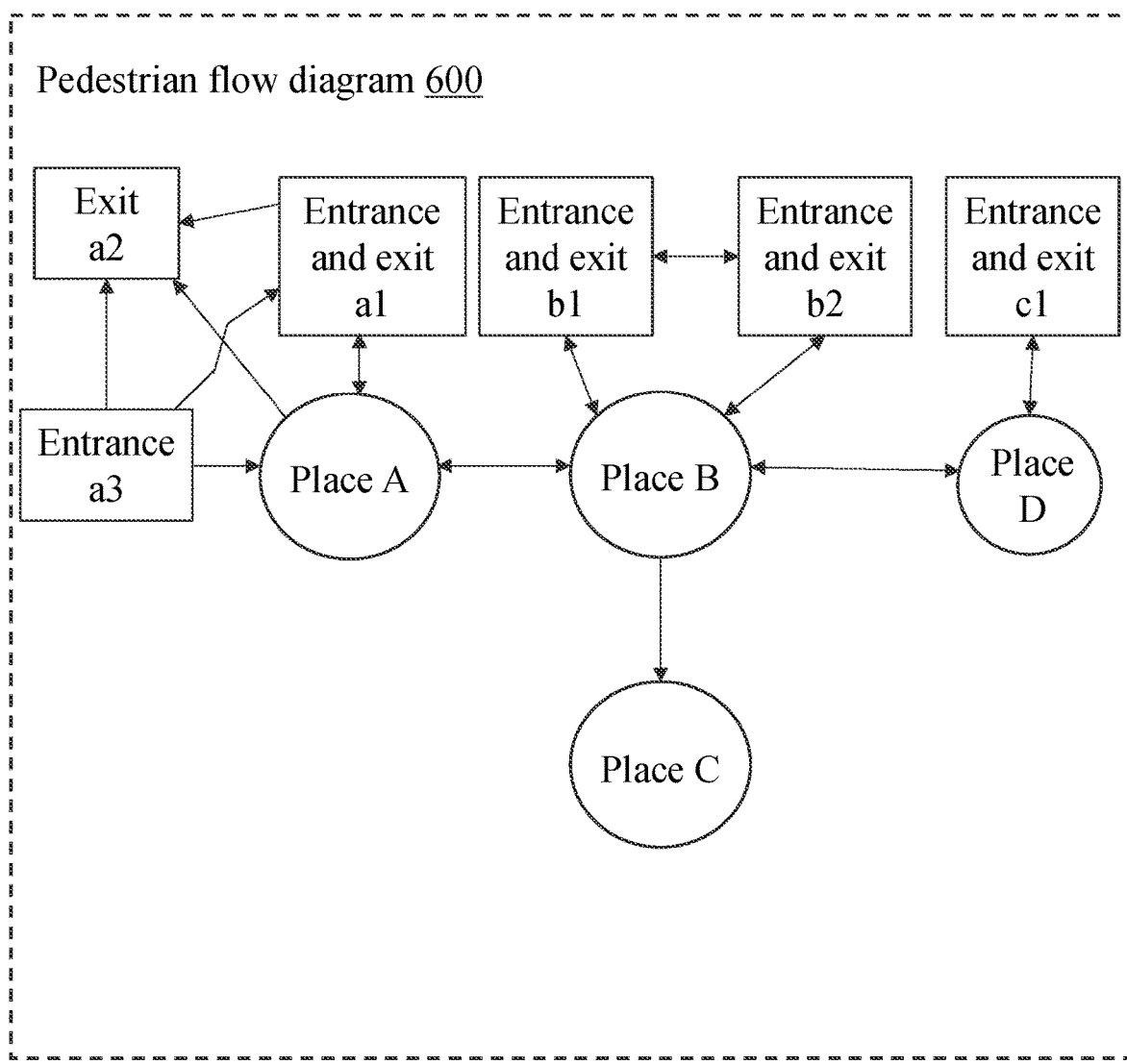
FIG. 6 is an exemplary schematic diagram of a pedestrian flow diagram according to some embodiments of the present disclosure.

A node may include one or more of place, available entrances, exits, and passages of the place, and open crowd gathering places. As shown in FIG. 6, the nodes of the pedestrian flow diagram 600 may include a place A, a place B, a place C, a place D, and an entrance and exit a1, an exit a2, an entrance a3, an entrance and exit b1, an entrance and exit b2, an entrance and exit c1.

Node feature may include node type, and a pedestrian flow and control measures in a current time period.

The node type may be used to distinguish different nodes in the pedestrian flow diagram. For example, the node type may include places, entrances, and exits, passages, open crowd gathering places (e.g., squares, open spaces), or the like. As shown in FIG. 6, the pedestrian flow diagram 600 may include place nodes, such as place nodes of the place A, entrance and exit nodes, such as nodes of the entrance and exit a1.

The node type may also be preset based on experience and used to characterize types of the places that is strongly correlated with pedestrian flow. Exemplarily, the node may be a bar node, a mall node, a movie theater node, or the like. For example, the node of place A of the pedestrian flow diagram 600 may be a shopping mall (not shown).

The pedestrian flow in a current time period may be a pedestrian flow in a preset time period up to a current time point, for example, a previous week, a previous month, etc.

The control measures may include open/closed states. The control measures may characterize whether people are allowed to enter. For example, whether places, entrances and exits, the open gathering places are closed (whether people are allowed to flow). Please refer to FIG. 1 and its description for more details about control measures.

Edges of the pedestrian flow diagram may be formed by connecting nodes whose distances satisfy a preset distance threshold. In some embodiments, the edges of the pedestrian flow diagram may be directed edges, which may be used to characterize directions of pedestrian flow between nodes. For example, a node whose node type is entrance and exit, when the entrance is a one-way entrance (for example, exit or entrance), other nodes are connected to the node, and arrow points to a directed edge formed by the node, which may indicate that the pedestrian flow inflows from other nodes and no pedestrian flow outflows. As shown in FIG. 6, the edges of the pedestrian flow diagram 600 may include a bidirectional edge generated by a connection between the node of the place A and the node of the entrance and exit a1 (available for entrance and exit), a one-way edge generated by a connection between the node of the place A and node of an exit a2 (only available for exit).

An edge feature may include a distance. The distance may characterize a relative distance between nodes. For example, the distance may be determined based on a distance (e.g., straight-line distance, walking distance, etc.) between two actual places corresponding to the two place nodes.

The edge feature may also include a feature difference. The feature difference may be used to characterize a correlation difference between two nodes connected by an edge. For example, the feature difference may be a difference between the node types of two nodes. For example, there may be bookstores and dance halls near a bar. A correlation between the bar and the dance hall may be larger, and a correlation between the bar and the bookstore may be smaller. Correspondingly, a probability of a pedestrian flow from the bar to the dance hall may be relatively large, and the probability of a pedestrian flow from the bar to bookstores may be relatively small. The feature difference may also be related to a distance between two nodes. For example, when there are many places in an area, but the distance between places is large, the feature difference is also large.

In some embodiments, the management platform 130 may construct the pedestrian flow diagram 600 based on the relevant information of a plurality of places in the target area obtained from the management sub-platform and/or the general database of the management platform 130 and historical pedestrian flow data. Exemplarily, the pedestrian flow diagram 600 may be a pedestrian flow diagram constructed based on relevant information of a plurality of places in the area A of the city and the control measures of each place.

In step 520, inputting the diagram structure into an evaluation model, outputting pedestrian flow preset by all the nodes in the diagram structure in a future time period, and obtaining the evaluation values of the candidate control schemes.

The evaluation model may refer to a model for processing the pedestrian flow diagram. The evaluation model may be a trained machine learning model. The evaluation model may include other models, for example, any one or a combination of a recurrent neural network model, a convolutional neural network, or other custom model structures.

In some embodiments, the evaluation model may be a graph neural network model. The management platform 130 may input the pedestrian flow diagram 600 into the evaluation model, and output the pedestrian flow preset by all nodes of the pedestrian flow diagram 600 in a future time period based on processing of the evaluation model.

In some embodiments, the evaluation model may be obtained by training with a plurality of training samples and labels. The training samples may be a plurality of sample pedestrian flow diagrams constructed based on the relevant information and historical control measures of a plurality of places in a plurality of sample areas. A label may be the historical pedestrian flow corresponding to a sample pedestrian flow diagram after historical control measures. The label of the historical pedestrian flow may be determined by counting a sum of the pedestrian flow of all places corresponding to a sample pedestrian flow diagram. Labels may be labelled based on manual methods. During training, a plurality of labeled training samples may be input into an initial evaluation model, a loss function may be constructed from the labels and an output of the initial evaluation model, and parameters of the evaluation model may be iteratively updated based on the loss function. When the loss function of the initial evaluation model converges or a count of iterations reaches a threshold, the training may be completed and a trained evaluation model may be obtained.

In some embodiments, different control measures in the pedestrian flow diagram 600 may correspond to different candidate control schemes. Based on the processing of the pedestrian flow diagram 600 by the evaluation model, evaluation values of each candidate control scheme among the plurality of candidate control schemes may be obtained.

Exemplarily, the management platform 130 may separately obtain historical pedestrian flow data of places corresponding to all the nodes, and after obtaining a predicted pedestrian flow preset by all nodes in a future period output by the pedestrian flow diagram 600, determine evaluation coefficients of all nodes based on the relationship between the pedestrian flow output by the nodes and the historical pedestrian flow data, and then determine the evaluation values of the candidate control schemes.

For relevant content of the evaluation coefficients and evaluation values, please refer to FIG. 4 and its description.

In some embodiments, the management platform 130 may determine the pedestrian flow of nodes based on a control measure of a certain place in the candidate control scheme. The pedestrian flow of the nodes may be determined based on formulas. In response to a place corresponding to a node being a closed node, the pedestrian flow of the closed node may be zero; in response to a place corresponding to the node being a non-closed node, the pedestrian flow of the non-closed node may be determined based on a formula, parameters of the formula may be related to a pedestrian flow the non-closed node and the closed nodes adjacent to the non-closed node before implementing to close.

In some embodiments, the management platform 130 may determine the pedestrian flow of the node based on a following formula.

$$V'_i = p*V_i + d\Sigma_{k=1}(V_k*R*Q) \quad (1)$$

where the $V'_i$ is the pedestrian flow of the non-closed node after the pedestrian flow diagram 600 is updated, and $V_i$ is a pedestrian flow before the pedestrian flow diagram 600 is updated. i>0 represents a i-th non-closed node in the pedestrian flow diagram 600. p and d are preset weight coefficients, for example, p=0.3, d=0.5.

$V_k$ is a node connected to the node $V_i$ from a non-closed node to a closed node in this update of the pedestrian flow diagram 600, and a value of $V_k$ represents a pedestrian flow before the node $V_k$ is closed. k is greater than or equal to 1.

It should be understood that, after a node connected to the non-closed node $V_i$ is changed from non-closed to closed, the pedestrian flow of the node may flow to non-closed nodes adjacent to the closed node. Q represents a probability value of the pedestrian flow flows (or transfers) from $V_k$ to $V_i$, and a value of Q may be preset, for example, Q=0.3. It should be noted that the value of Q may represent a probability of pedestrian flow transferring, which may also be determined based on a feature difference of an edge formed by the nodes. It should be understood that when types of the two nodes are similar, the value of Q may be larger.

A value of R in formula (1) may be determined based on a distance and/or a feature difference value of the edge features. A pedestrian flow $V'_i$ of the non-closed node $V_i$ after an update of the pedestrian flow diagram 600 may be positively correlated with the value of R. It should be understandable that when the types of two nodes are similar (for example, bars and dance halls) or the distance is close, the value of R may be larger.

In some embodiments, referring to a plurality of candidate control schemes determined based on a preset algorithm shown in FIG. 4, as a new candidate control scheme is generated, the management platform 130 may update control measures of corresponding nodes in the pedestrian flow diagram 600 (for example, updating the closed state of a node) referring to control measures of new generated candidate control scheme. At the same time, the non-closed nodes in the pedestrian flow diagram 600 may be updated by the formula (1), and finally, the updated pedestrian flow diagram 600 may be processed through the evaluation mode to obtain the evaluation value of each new generated candidate control scheme.

Some embodiments of the present disclosure may process the pedestrian flow diagram based on the evaluation model to obtain the evaluation value of the candidate control scheme, which may be helpful to quickly obtain the evaluation value of the new generated candidate control scheme, and achieve a higher efficiency of determining an optimal candidate control scheme. In addition, the pedestrian flow of adjacent nodes before implementing to close are introduced, probability of the pedestrian flow flows after implementing to close may be considered, which makes pedestrian flow of obtained nodes more accurate.

The basic concepts have been described above. Obviously, for those skilled in the art, the above detailed disclosure is only an example and does not constitute a limitation of the present disclosure. Although it is not explicitly stated here, those skilled in the art may make various modifications, improvements, and amendments to the present disclosure. Such modifications, improvements and amendments are suggested in the present disclosure, so such modifications, improvements and amendments still belong to the spirit and scope of the exemplary embodiments of the present disclosure.

Meanwhile, the present disclosure uses specific words to describe the embodiments of the present disclosure. For example, "one embodiment", and/or "some embodiments" mean a certain feature or structure related to at least one embodiment of the present disclosure. Therefore, it should be emphasized and noted that "one embodiment" or "an alternative embodiment" mentioned twice or more in different positions in the present disclosure does not necessarily refer to the same embodiment. In addition, certain features or structures in one or more embodiments of the present disclosure may be appropriately combined.

In addition, unless explicitly stated in the claims, the sequence of processing elements and sequences, the use of numbers and letters, or the use of other names described in the present disclosure are not used to define the sequence of processes and methods in the present disclosure. Although the above disclosure has discussed some currently considered useful embodiments of the invention through various examples, it should be understood that such details are only for the purpose of explanation, and the additional claims are not limited to the disclosed embodiments. On the contrary, the claims are intended to cover all amendments and equivalent combinations that conform to the essence and scope of the embodiments of the present disclosure. For example, although the system components described above can be implemented by hardware devices, they can also be implemented only by software solutions, such as installing the described system on an existing server or mobile device.

Similarly, it should be noted that, in order to simplify the description disclosed in the present disclosure and thus help the understanding of one or more embodiments of the disclosure, the foregoing description of the embodiments of the present disclosure sometimes incorporates a variety of features into one embodiment, the drawings or the description thereof. However, this disclosure method does not mean that the object of the present disclosure requires more features than those mentioned in the claims. In fact, the features of the embodiments are less than all the features of the single embodiments disclosed above.

In some embodiments, numbers describing the count of components and attributes are used. It should be understood that such numbers used in the description of embodiments are modified by the modifier "about", "approximate" or "generally" in some examples. Unless otherwise stated, "approximately" or "generally" indicate that ±20% of change in the figure is allowed. Accordingly, in some embodiments, the numerical parameters used in the description and claims are approximate values, and the approximate values can be changed according to the characteristics required by individual embodiments. In some embodiments, the numerical parameter should consider the specified significant digits and adopt the method of general digit reservation. Although the numerical fields and parameters used to confirm the range breadth in some embodiments of the present disclosure are approximate values, in specific embodiments, the setting of such values is as accurate as possible within the feasible range.

For each patent, patent application, patent application disclosure and other materials cited in the present disclosure, such as articles, books, specifications, publications, documents, etc., the entire contents are hereby incorporated into the present disclosure for reference. Except for the application history documents that are inconsistent with or conflict with the contents of the present disclosure, the documents that limit the widest range of claims in the present disclosure (currently or later appended to the present disclosure) are excluded. It should be noted that in case of any inconsistency or conflict between the description, definitions, and/or use of terms in the supplementary materials of the present disclosure and the contents described in the present disclosure, the description, definitions, and/or use of terms in the present disclosure shall prevail.

Finally, it should be understood that the embodiments described in the present disclosure are only used to illustrate the principles of the embodiments of the present disclosure. Other deformations may also fall within the scope of the present disclosure. Therefore, as an example rather than a limitation, the alternative configuration of the embodiments of the present disclosure can be regarded as consistent with the teachings of the present disclosure. Accordingly, the embodiments of the present disclosure are not limited to those explicitly introduced and described in the present disclosure.

What is claimed is:

1. A method for place recommendation in a smart city based on an Internet of Things, wherein the method is implemented by a management platform of an Internet of Things system for place recommendation in the smart city, comprising:
   obtaining place information and pedestrian flow information of places, wherein the place information includes a count of the places, at least one distance between the places, and control measures for entrances and exits in each place, and control measures for passages, and the control measures include whether the entrances, exits, and passages in each place are closed;
   determining a plurality of candidate control schemes for the places based on the place information and the pedestrian flow information of the places, wherein each candidate control scheme includes a vector composed of control measure of each place, and the each candidate control scheme has one or more evaluation values; and
   determining a target control scheme of the places based on the plurality of candidate control schemes, comprising:
   determining the target control scheme through performing a plurality of rounds of iterative updates on the plurality of candidate control schemes until a preset condition is satisfied, in response to a determination that a count of the places is greater than a preset count threshold, comprising:
      determining evaluation value of each first candidate control scheme, wherein when a count of an iteration round is one, the first candidate control schemes are a plurality of initial candidate control schemes, when a count of the iteration round is greater than one, the first candidate control schemes are the plurality of candidate control schemes filtered in a previous round;
      determining second candidate control schemes from the first candidate control schemes based on the evaluation value of each first candidate control scheme;
      determining third candidate control schemes through performing a transformation on the second candidate control schemes;
      repeating the iteration process until the preset condition is satisfied; and
      determining the target control scheme from the third candidate control schemes obtained through a plurality of rounds of the iteration process;
      wherein the management platform executes a control measure of each place to adjust between an open or close state corresponding to the target control scheme.

2. The method for place recommendation in the smart city based on the Internet of Things of claim 1, wherein the Internet of Things system for place recommendation in the smart city also includes a user platform, a service platform, a sensor network platform, and an object platform;
   the user platform is configured to obtain a query instruction of a user for at least one pedestrian flow control scheme of the places, and transmit the query instruction to the management platform through the service platform;
   the object platform is configured to obtain the place information and the pedestrian flow information, and the sensor network platform is configured to transmit the place information and the pedestrian flow information to the management platform;
   the method further comprising:
   transmitting the target control scheme to the user platform based on the service platform.

3. The method for place recommendation in the smart city based on the Internet of Things of claim 1, wherein the determining a plurality of candidate control schemes for the places based on the place information and the pedestrian flow information of the places includes:
   constructing a first feature vector corresponding to the places based on the place information and the pedestrian flow information of the places;
   performing vector retrieval in a vector database based on the first feature vector, and taking a vector in the vector database whose vector distance from the first feature vector is less than a preset distance threshold as a candidate vector;

determining a control measure corresponding to the candidate vector as a candidate control measure; and summarizing the candidate control measures of the entrances, exits, and passages of each place in the places as the plurality of candidate control schemes.

4. The method for place recommendation in the smart city based on the Internet of Things of claim 1, wherein the transformation includes a first transformation and a second transformation, the first transformation includes: selecting two second candidate control schemes from a plurality of the second candidate control schemes, exchanging control measure of a same place in the selected two second candidate control schemes to generate a new third candidate control scheme after the first transformation; and the second transformation includes: adjusting control measures of one or more places to generate a new third candidate control scheme after the second transformation based on the third candidate control schemes generated by the first transformation.

5. The method for place recommendation in the smart city based on the Internet of Things of claim 1, wherein the determining third candidate control schemes through performing a transformation on the second candidate control schemes includes:

filtering the third candidate control schemes based on evaluation values of the third candidate control schemes, and determining the filtered third candidate control schemes as third candidate control schemes for a next round of iteration or using the filtered third candidate control schemes to determine the target control scheme.

6. The method for place recommendation in the smart city based on the Internet of Things of claim 1, wherein the preset condition includes at least one of: a count of iteration reaching a preset count of iterations, a maximum evaluation value of the candidate control schemes reaching a preset expected value, the evaluation value remaining unchanged after the preset count of iterations, or a difference between evaluation values of two adjacent iterations being lower than a preset difference threshold.

7. The method for place recommendation in the smart city based on the Internet of Things of claim 1, wherein the evaluation values of the candidate control schemes are determined based on an evaluation model including:

constructing a diagram structure, wherein nodes of the diagram structure include at least one of the place, available entrance and exit of the place, passage, and a crowd gathering place of an open place; a node feature includes a node type, a pedestrian flow in a current time period, and the control measure; edges of the diagram structure are formed by connecting nodes corresponding to places whose distances satisfy a preset distance threshold; and edge feature includes a distance and a feature difference; and inputting the diagram structure into the evaluation model, outputting pedestrian flow preset by all the nodes in the diagram structure in a future time period, and obtaining the evaluation values of the candidate control schemes.

8. The method for place recommendation in the smart city based on the Internet of Things of claim 7, the method further comprising:

determining a pedestrian flow of a node according to a control measure of a place in the candidate control scheme, including:

in response to a determination that the node corresponding to the place is a closed node, a pedestrian flow of the closed node being zero; and in response to a determination that the node corresponding to the place is a non-closed node, the pedestrian flow of the non-closed node being determined based on a formula, wherein parameters of the formula are related to the pedestrian flow of the non-closed node and pedestrian flow of closed nodes adjacent to the non-closed node before the closed nodes are closed.

9. An Internet of Things system for place recommendation in a smart city, wherein the system includes a management platform, and the management platform is configured to perform operations including:

obtaining place information and pedestrian flow information of places, wherein the place information includes a count of the places, at least one distance between the places, and control measures for entrances and exits in each place, and control measures for passages, and the control measures include whether the entrances, exits, and passages in each place are closed;

determining a plurality of candidate control schemes for the places based on the place information and the pedestrian flow information of the places, wherein each candidate control scheme includes a vector composed of control measure of each place, and the each candidate control scheme has one or more evaluation values; and determining the target control scheme of the places based on the plurality of candidate control schemes, comprising:

determining the target control scheme through performing a plurality of rounds of iterative updates on the plurality of candidate control schemes until a preset condition is satisfied, in response to a determination that a count of the places is greater than a preset count threshold, comprising:

determining evaluation value of each first candidate control scheme, wherein when a count of an iteration round is one, the first candidate control schemes are a plurality of initial candidate control schemes, when a count of the iteration round is greater than one, the first candidate control schemes are the plurality of candidate control schemes filtered in a previous round;

determining second candidate control schemes from the first candidate control schemes based on the evaluation value of each first candidate control scheme;

determining third candidate control schemes through performing a transformation on the second candidate control schemes;

repeating the iteration process until the preset condition is satisfied; and determining the target control scheme from the third candidate control schemes obtained through a plurality of rounds of the iteration process;

wherein the management platform executes a control measure of each place to adjust between an open or close state corresponding to the target control scheme.

10. The Internet of Things system for place recommendation in the smart city of claim 9, wherein the system also includes a user platform, a service platform, a sensor network platform, and an object platform;

the user platform is configured to obtain a query instruction of a user for at least one pedestrian flow control scheme of the at least one place, and transmit the query instruction to the management platform through the service platform;

the object platform is configured to obtain the place information and the pedestrian flow information, and the sensor network platform is configured to transmit the place information and the pedestrian flow information to the management platform; and the service platform is configured to transmit the target control scheme to the user platform.

11. The Internet of Things system for place recommendation in the smart city of claim 9, wherein the management platform is further configured to perform operations including:

constructing a first feature vector corresponding to the places based on the place information and the pedestrian flow information of the places;

performing vector retrieval in a vector database based on the first feature vector, and taking a vector in the vector database whose vector distance from the first feature vector is less than a preset distance threshold as a candidate vector;

determining a control measure corresponding to the candidate vector as a candidate control measure; and summarizing the candidate control measures of the entrances, exits, and passages of each place in the places as the plurality of candidate control schemes.

12. The Internet of Things system for place recommendation in the smart city of claim 9, wherein the transformation includes a first transformation and a second transformation, the first transformation includes: selecting two second candidate control schemes from a plurality of the second candidate control schemes, exchanging control measure of a same place in the selected two second candidate control schemes to generate a new third candidate control scheme after the first transformation; and the second transformation includes: adjusting control measures of one or more places to generate a new third candidate control scheme after the second transformation based on the third candidate control schemes generated by the first transformation.

13. The Internet of Things system for place recommendation in the smart city of claim 9, wherein the management platform is further configured to perform operations including:

filtering the third candidate control schemes based on evaluation values of the third candidate control schemes, and determining the filtered third candidate control schemes as third candidate control schemes for a next round of iteration or using the filtered third candidate control schemes to determine the target control scheme.

14. The Internet of Things system for place recommendation in the smart city of claim 9, wherein the preset condition includes at least one of: a count of iteration reaching a preset count of iterations, a maximum evaluation value of the candidate control schemes reaching a preset expected value, the evaluation value remaining unchanged after the preset count of iterations, or a difference between evaluation values of two adjacent iterations being lower than a preset difference threshold.

15. The Internet of Things system for place recommendation in the smart city of claim 9, wherein the evaluation values of the candidate control schemes are determined based on an evaluation model, and the management platform is further configured to perform operations including:

constructing a diagram structure, wherein nodes of the diagram structure include at least one of the place, available entrance and exit of the place, passage and a crowd gathering place of an open place; a node feature includes a node type, a pedestrian flow in a current time period, and the control measure; edges of the diagram structure are formed by connecting nodes corresponding to places whose distances satisfy a preset distance threshold; and an edge feature includes a distance and a feature difference; and inputting the diagram structure into the evaluation model, outputting pedestrian flow preset by all the nodes in the diagram structure in a future time period, and obtaining the evaluation values of the candidate control schemes.

16. The Internet of Things system for place recommendation in the smart city of claim 15, wherein the management platform is further configured to perform following operations:

determining a pedestrian flow a node according to a control measure of a place in the candidate control scheme, including:

in response to a determination that the node corresponding to the place is a closed node, a pedestrian flow of the closed node being zero; and in response to a determination that the node corresponding to the place is a non-closed node, the pedestrian flow of the non-closed node being determined based on a formula, wherein parameters of the formula are related to the pedestrian flow of the non-closed node and pedestrian flow of closed nodes adjacent to the non-closed node before the closed nodes are closed.

\* \* \* \* \*